United States Patent
Mardikar et al.

(10) Patent No.: US 10,909,518 B2
(45) Date of Patent: Feb. 2, 2021

(54) DELEGATION PAYMENT WITH PICTURE

(71) Applicant: PAYPAL, INC., San Jose, CA (US)

(72) Inventors: Upendra Mardikar, San Jose, CA (US); Attaullah Baig, Austin, TX (US)

(73) Assignee: PAYPAL, INC., San Jose, CA (US)

( * ) Notice: Subject to any disclaimer, the term of this patent is extended or adjusted under 35 U.S.C. 154(b) by 58 days.

(21) Appl. No.: 13/904,910

(22) Filed: May 29, 2013

(65) Prior Publication Data

US 2014/0258010 A1  Sep. 11, 2014

Related U.S. Application Data

(60) Provisional application No. 61/774,523, filed on Mar. 7, 2013.

(51) Int. Cl.
  G06Q 20/20 (2012.01)

(52) U.S. Cl.
  CPC .................. G06Q 20/202 (2013.01)

(58) Field of Classification Search
  CPC ........ G06Q 20/20; G06Q 20/10; G06Q 20/32; G06Q 20/3278; G06Q 20/4014; G06Q 20/102; G06Q 20/3572; G06Q 20/40145; G06Q 20/40; G06Q 30/0225; G06Q 20/322; G06Q 20/405; G06Q 20/34; G06Q 20/202
  USPC .................. 705/16, 21, 39, 40, 67
  See application file for complete search history.

(56) References Cited

U.S. PATENT DOCUMENTS

| 7,249,092 | B2 * | 7/2007 | Dunn | G06Q 20/04 235/379 |
|---|---|---|---|---|
| 8,336,770 | B2 * | 12/2012 | Grillion | G06Q 20/10 235/375 |
| 8,577,810 | B1 * | 11/2013 | Dalit et al. | 705/67 |
| 8,682,802 | B1 * | 3/2014 | Kannanari | G06Q 20/3274 705/64 |
| 8,966,570 | B1 * | 2/2015 | Roth | H04L 63/08 726/1 |
| 10,417,634 | B1 * | 9/2019 | Strand | G06Q 20/42 |
| 2002/0123938 | A1 * | 9/2002 | Yu | G06Q 30/0617 705/26.43 |

(Continued)

Primary Examiner — Florian M Zeender
Assistant Examiner — Milena Racic
(74) Attorney, Agent, or Firm — Haynes and Boone, LLP

(57) ABSTRACT

A user who is authorizing a delegate to make a purchase using funds from an account of the user sends information to a payment provider. The information includes a picture of the delegate, along with information such as a merchant name, a maximum amount, a type of purchase, item information, and/or any other transaction limitations/restrictions. The payment provider then transmits this information to the merchant. A one-time code or number may be communicated to the delegate. When the delegate is ready to make a payment with the user account, the delegate gives the delegate's name and/or other identifying information to the merchant, along with the payment code. The merchant enters the information and is shown a picture of the delegate. If there is a match, the payment may be submitted for processing. In one embodiment, a photo of the delegate may be taken by the merchant and the image transmitted to the user. The user may then be requested to confirm the delegate as an authorized delegate.

21 Claims, 3 Drawing Sheets

(56) References Cited

U.S. PATENT DOCUMENTS

| | | | | |
|---|---|---|---|---|
| 2002/0142815 A1* | 10/2002 | Candelore | G06Q 30/02 | 463/1 |
| 2006/0163344 A1* | 7/2006 | Nwosu | G06Q 20/105 | 235/380 |
| 2008/0134311 A1* | 6/2008 | Medvinsky | G06F 21/33 | 726/7 |
| 2009/0313129 A1* | 12/2009 | Rothschild | G06Q 20/04 | 705/17 |
| 2010/0084462 A1* | 4/2010 | Scipioni | G06Q 20/40145 | 235/380 |
| 2010/0138344 A1* | 6/2010 | Wong | G06Q 20/10 | 705/44 |
| 2011/0251962 A1* | 10/2011 | Hruska | G06Q 20/0457 | 705/72 |
| 2012/0138679 A1* | 6/2012 | Doyle | G06K 19/06037 | 235/380 |
| 2012/0150669 A1* | 6/2012 | Langley | G06Q 30/0601 | 705/16 |
| 2012/0278155 A1* | 11/2012 | Faith | G06Q 20/40145 | 705/14.26 |
| 2012/0290421 A1* | 11/2012 | Qawami et al. | | 705/21 |
| 2012/0310743 A1* | 12/2012 | Johri | G06Q 20/204 | 705/14.58 |
| 2012/0330764 A1* | 12/2012 | Nahidipour | G06Q 20/3278 | 705/17 |
| 2013/0006857 A1* | 1/2013 | Sinton | G06Q 20/20 | 705/44 |
| 2013/0024366 A1* | 1/2013 | Mukherjee | G06Q 20/20 | 705/40 |
| 2013/0262309 A1* | 10/2013 | Gadotti | G06Q 20/3276 | 705/44 |
| 2014/0214670 A1* | 7/2014 | McKenna | G06Q 20/40145 | 705/44 |

\* cited by examiner

DELEGATION PAYMENT WITH PICTURE

CROSS REFERENCE TO RELATED APPLICATION

This application claims the benefit of U.S. Provisional Pat. Application Ser. No. 61/774,523, filed Mar. 7, 2013, which is incorporated by reference in its entirety.

BACKGROUND

Field of the Invention

The present invention generally relates financial transactions, and in particular, to financial transactions at a physical point of sale.

Related Art

There are situations when a purchaser of goods or services is unable to make the purchase in person, such as due to time constraints, travel restrictions or the like. Instead of having to wait until the user or purchaser can make the purchase, a delegate or representative of a user may need to make a purchase on behalf of the user or with funds from the user. Examples include contractors, sub-contractors, handymen, friends, etc. In such cases, the user may give the delegate a payment instrument, such as a credit card, a bank card, a blank check, and/or a certain amount of cash. An obvious disadvantage is that the user has no control or limited control over what the delegate can spend and what they can spend the user's funds on.

Therefore, a need exists to enable a user to better control a delegate's spending.

Figure 1:
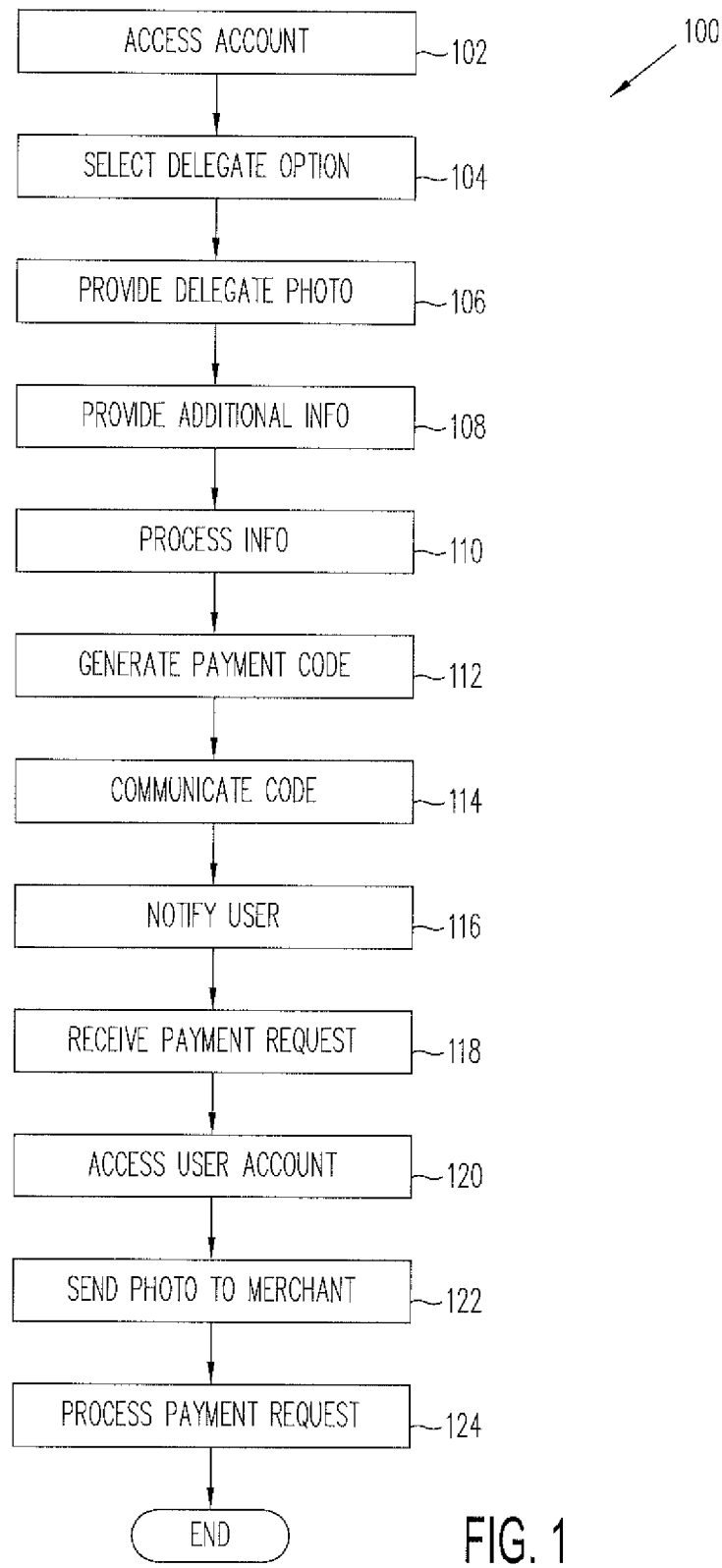
FIG. 1 is a flowchart showing a process for enabling payments by a user delegate at a physical point of sale according to one embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

According to one embodiment, a user (purchaser or account holder) who is authorizing another (a delegate) to make a purchase using funds from an account of the user sends information to a payment provider used to process the purchase or payment. In one embodiment, the information includes a picture of the delegate, along with information such as a merchant name, a maximum amount, a type of purchase, item information, and/or any other transaction limitations/restrictions. The payment provider then transmits this information to the merchant. In one embodiment, a one-time code or number may be communicated to the delegate. When the delegate is ready to make a payment with the user account, the delegate gives the delegate's name and/or other identifying information to the merchant, along with the payment code if applicable. The merchant enters the information and is shown a picture of the delegate, such as on a merchant device. If there is a match, the payment may be submitted for processing, where the delegate may provide the payment code to the merchant at any suitable stage of the transaction and the code then communicated to the payment provider with other transaction information. In one embodiment, a photo of the delegate may be taken by the merchant and the image transmitted to the user. The user may then be requested to confirm the delegate as an authorized delegate. In this manner, the user can control what the delegate can spend and how the funds are used, while ensuring that the person making the purchase is the authorized delegate of the user.

FIG. 1 is a flowchart showing a process 100 for enabling payments by a user's delegate at a physical point of sale according to one embodiment. At step 102, a user accesses an account of the user with a payment provider, such as PayPal, Inc. of San Jose, Calif. Account access may be through a user device, such as a PC, smart phone, computing tablet, or the like, via a mobile app, a payment provider site, etc. Access may include the user entering a user identifier, such as an email address, a user name, or a phone number, along with a password or PIN. If the device "remembers" the user, only the password or PIN may be required. Once accessed, the user may select, at step 104, an option or feature to allow a delegate to use funds from the user account to make one or more purchases on behalf of the user at a merchant location. Selection may be through a tap, click, or other means on a link, button, or drop-down menu.

Next, the user may be requested to provide a photo of the delegate or information that allows a photo of the delegate to be obtained by the service provider. For example, the user may have the option of choosing an existing photo through the user device or to take a picture of the delegate. The user may choose a delegate from a drop down menu, list, or contacts having a photo associated with the delegate. The user may also enter or select a delegate name, phone number, or other information that allows the payment provider to search and provide one or more suggested photos, such as through the payment provider database or publicly available sources, including social networks. The user may then select one of the suggested photos, or if none of the suggested photos are desirable, such as not matching the actual desired delegate, the user may request more photos or provide additional information to return more accurate results. The user then confirms a desired photo.

As such, the user provides a photo of the delegate, at step 106, either directly or indirectly, to the payment provider. Other information is also provided, at step 108. Other information may include one or more of the following: contact information for the delegate such as an email address or mobile phone number, the name of the delegate, authorized merchant names, authorized locations, an authorized maximum amount, authorized purchase types, authorized items, authorized dates, and any other transaction limitations/restrictions. For example, the delegate may only be allowed to shop at Best Buy stores and Home Depot stores in Los Angeles on Saturday, Jun. 15, 2013 and Sunday, Jun. 16, 2013, for purchases for video cable and paint accessories up to a maximum total of $100 in Best Buy and $200 in Home Depot or a total of $300 for both locations. In another example, the delegate may only make purchases between 3 p.m. and 5 p.m. on a specified day and/or only for a Sony TV Model XTD45U2.

Instead of only authorized information, the user may specify unauthorized conditions only or with one or more authorized conditions. Examples of unauthorized conditions include unauthorized use days and/or times, merchants, items, etc. For example, the user may prohibit purchases of alcoholic beverages at Costco. Such information may be provided through any suitable means include voice, text, selection from a list, etc. The payment provider may also provide a map of local merchants for the user to select from, where "local" may be where the delegate or the user is located. The more information that is provided, the more control the user has over the delegate's spending. However, more limitations may reduce the flexibility the delegate has to purchase something that is needed, but not contemplated initially by the user. Further, additional limitations require more time for the user to provide. Thus, the user may have an option of providing as much or as little limitations as desired.

The information is then processed by the payment provider at step 110. If any limitations cannot be approved through the user account, the user may be notified to change any such limitations. For example, the authorized amount may exceed an account limit and/or an authorized location may not be allowed by the system (due to security reasons) or by the user as part of default account settings.

If the delegate can be approved for using the user's account, the payment provider, in one embodiment, may generate a one-time use code or number, at step 112. The code may be associated with the particular delegate request, subject to the limitations and other information of the request. After generation, the code may be communicated to the delegate, at step 114. Communication may be to a delegate device, such as a smart phone, PC, or computing tablet, and can be through voice or text (such as email or SMS), depending on the format of the code. For example, the code may be in the form of a QR or barcode, which would be communicated through text, while an alphabetic, numeric, or alphanumeric code may be communicated by voice as well. In addition to the code, the delegate may also receive information about use conditions of the code, such as maximum amount, authorized purchases, purchase restrictions, etc.

The user may also be notified, at step 116, of an authorized delegate payment request. Notification can be through the user device, again by voice or text. The notification may simply contain a confirmation of approval and/or may include additional information, such as the details of the use limitations provided by the user earlier and/or the one-time code sent to the delegate.

In another embodiment, the code may be communicated only to the user by the payment provider, and the user then communicates the code to the delegate.

The delegate, upon receiving the code, can now use the user's payment provider account to make a purchase. The delegate may be related to the user, work for the user, or have some other relationship to the user such that the user would want to authorize the delegate to make a purchase using the user's funds.

When the delegate is ready to make a purchase, the user may be at a store or other physical location. At any time prior to, during, or after checkout, the delegate may inform the merchant that the delegate wishes to pay with the payment provider. This can be through any suitable means, such as selecting a button or link on a merchant POS device. The delegate may then be asked, in one embodiment, to enter a phone number of the delegate mobile device, along with a PIN. This may be a normal flow for payment using the payment provider for a user directly paying through the payment provider. For the PIN portion, the delegate may enter the code into a PIN pad, or otherwise communicate the PIN to the merchant, such as showing the code displayed on the delegate device to the merchant and having the code scanned if needed (in the case of a barcode or QR code) or saying the code to the merchant.

In another embodiment, the delegate provides another identifier, such as a driver's license, a name, etc., and the payment code if required. Alternatively, the payment code may be provided at another stage of the transaction.

As such, a request for payment is received by the payment provider, at step 118. The request may include a delegate identifier, such as a name or number, and payment code, along with any other details, such as merchant identifier and transaction information is available. As noted above, the payment code and other details may be provided at different points of the transaction flow.

At step 120, the payment provider accesses a user account associated with the delegate phone number, delegate identifier, and/or payment code. In one embodiment, the payment code enables user account access. Other ways to access include a combination of user information (such as the user name, email address, or phone number) and delegate information (such as the delegate name, email address, or phone number). Note that the delegate does not need to have an account with the payment provider to make the purchase. Once accessed, the payment provider retrieves the photo associated with the delegate phone number and/or payment code within the user account. If the delegate is not authorized to use the user's account, for any reason, the payment provider may notify the merchant, who in turn may notify the delegate and request alternative payment. For example, the PIN or entered code may not be valid or properly associated with a user account, or the delegate may not be associated with the user.

If the delegate is authorized, the photo is sent to the merchant, such as via a merchant POS display device, at step 122. The merchant may then "match" the received photo with the delegate, such as by comparing the picture to the person attempting to make the transaction with the received photo. If the delegate is the one shown in the photo, the transaction may continue, based on the information already received.

For example, if the transaction or payment total has not been sent to the payment provider, the total may now be sent, and the transaction processed to determine whether it can be approved based on any use limitations or restrictions associated with the delegate payment. If the payment code has not been sent (and only the delegate identifier or other information was sent and used to access the delegate photo), the payment code may be communicated to the payment provider, along with transaction details (item descriptions, total cost, etc.) if still needed, which the payment provider then processes to approve or deny.

The payment provider processes the transaction, at step 124, which may include notifying the merchant, the delegate, and/or the user. The notification may indicate approval or denial of the payment request, along with other information, such as total amount paid, merchant name, itemized purchases, delegate name, etc.

If the transaction is denied, the payment provider may notify the user as to reasons for the denial, such as maximum amount exceeded. Depending on the reason(s), the user may have the option of changing one or more user-imposed or user-specified conditions/limitations. In that case, the user may make the changes through the user account by first being authenticated and accessing the account. The changes may then be submitted, and if approved, the transaction may be processed again. In another embodiment, the user may be given the option of expressly authorizing the purchase or changing one or more limitations directly through the user device and in response to the denial notification. For example, the user may be notified that the transaction is denied because it is for $102, while the delegate payment was set at a maximum of $100. The user may then be asked if the user will approve this transaction or whether the user wants to raise the maximum amount to the purchase amount (or a higher number).

As such, a user can control delegation spending without having to provide sensitive information, such as a credit or debit card number, while still maintaining some flexibility on the purchase.

In different embodiments, the merchant may take a photo of the delegate at the POS and transmit the photo to the payment provider, who can then match with the photo stored with the user account and/or transmit the merchant-taken photo to the user for the user to verify the delegate is authorized. In another embodiment, the payment provider may send an authorization request to the user before authorizing the payment. For example, the payment provider may send to a user device the transaction details and delegate identifier, such as a name, phone number, email address, and/or photo. If the user cancels or denies, the transaction is not approved. If the user approves, the payment provider may continue processing as described above.

Note that one or more steps described herein may be omitted, combined, or performed in a different sequence as desired.

Figure 2:
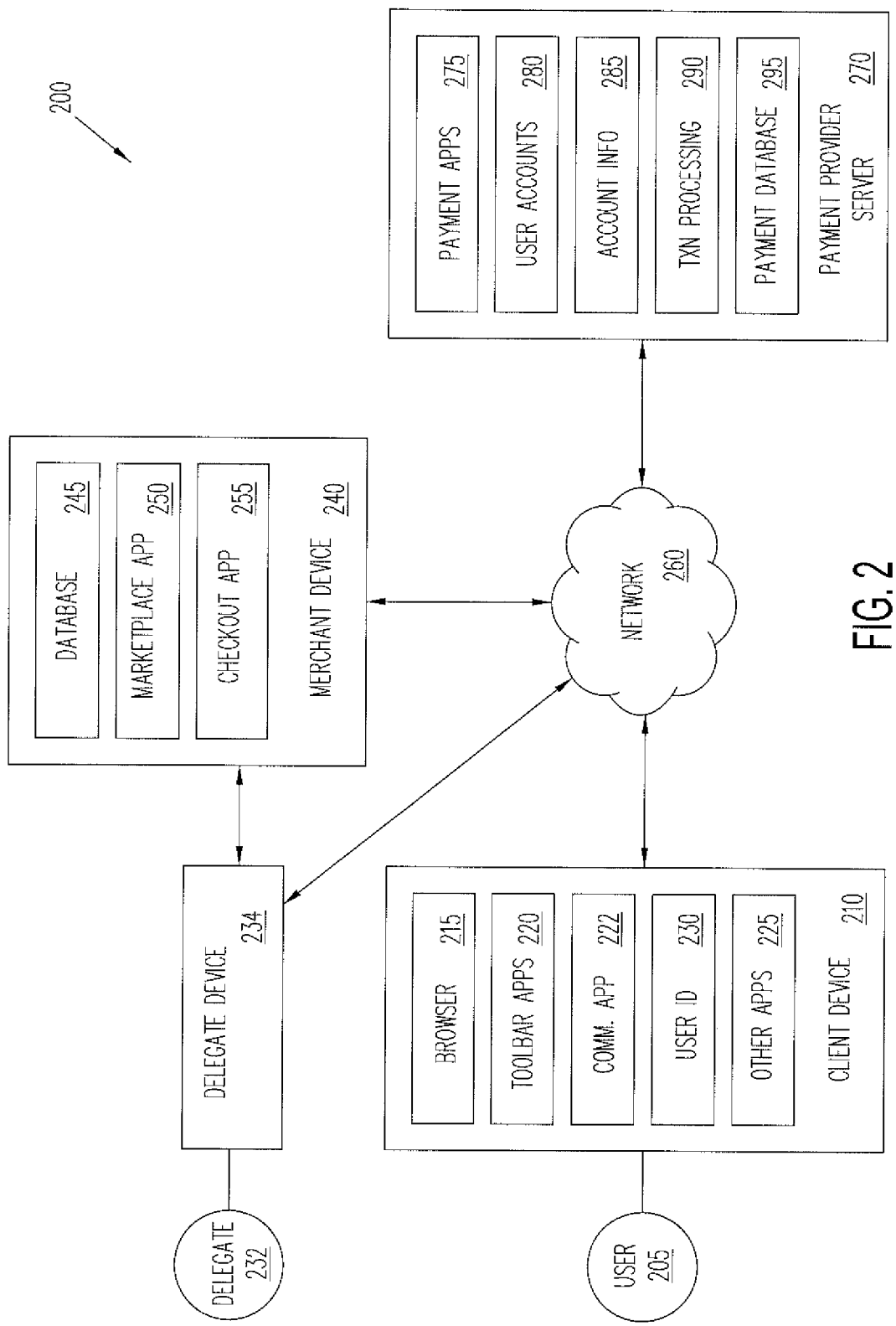
FIG. 2 is a block diagram of a networked system suitable for implementing the process of FIG. 1 according to another embodiment.

FIG. 2 is a block diagram of another networked system 200 configured to process a delegation payment transaction, such as described above, in accordance with an embodiment of the invention. System 200 includes a user device 210, a delegate device 232, a merchant device 240, and a payment provider server 270 in communication over a network 260. Payment provider server 270 may be maintained by a payment provider, such as PayPal, Inc. of San Jose, Calif. A user 205, such an account holder, is associated with user device 210, where the user is allowing a delegate 232 associated with delegate device 232 to perform a payment transaction with merchant device 240 using payment provider server 270.

User device 210, delegate device 232, merchant device 240, and payment provider server 270 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 200, and/or accessible over network 260.

Network 260 may be implemented as a single network or a combination of multiple networks. For example, in various embodiments, network 260 may include the Internet or one or more intranets, landline networks, wireless networks, and/or other appropriate types of networks.

User device 210 and delegate device 232 may be implemented using any appropriate hardware and software configured for wired and/or wireless communication over network 260. For example, in one embodiment, the user device and the delegate device may be implemented as a smart phone, a computing tablet, PC, or other computing device.

User device 210 may include one or more browser applications 215 which may be used, for example, to provide a convenient interface to permit user 205 to browse information available over network 260. For example, in one embodiment, browser application 215 may be implemented as a web or mobile browser configured to view information available over the Internet. User device 210 may also include one or more toolbar applications 220 which may be used, for example, to provide client-side processing for performing desired tasks in response to operations selected by user 205. In one embodiment, toolbar application 220 may display a user interface in connection with browser application 215 as described herein.

User device 210 may further include other applications 225 as may be desired in particular embodiments to provide desired features to user device 210. For example, other applications 225 may include security applications for implementing client-side security features, programmatic client applications for interfacing with appropriate application programming interfaces (APIs) over network 260, or other types of applications. Applications 225 may also include email, texting, voice and IM applications that allow user 205 to send and receive emails, calls, and texts through network 260, as well as applications that enable the user to communicate through the payment provider to perform various operations as discussed above. User device 210 includes one or more user identifiers 230 which may be implemented, for example, as operating system registry entries, cookies associated with browser application 215, identifiers associated with hardware of user device 210, or other appropriate identifiers, such as used for payment/user/device authentication. In one embodiment, user identifier 230 may be used by a payment service provider to associate user 205 with a particular account maintained by the payment provider. A communications application 222, with associated interfaces, enables user device 210 to communicate within system 200.

Delegate device 232 may be similar to user device 210 in function and capability as discussed above.

Merchant device 240 may be maintained, for example, by a merchant or seller offering various products and/or services in exchange for payment to be received over network 260. Generally, merchant device 240 may be maintained by anyone or any entity that receives money, which includes charities as well as retailers and restaurants. Merchant device 240 includes a database 245 identifying available products and/or services (e.g., collectively referred to as items) which may be made available for viewing and purchase by user 205 or delegate 232. Accordingly, merchant device 240 also includes a marketplace application 250 which may be configured to serve information over network 260 to browser 215 of user device 210 or to delegate device 232. In one embodiment, user 205 or delegate 232 may interact with marketplace application 250 through browser applications over network 260 in order to view various products, food items, or services identified in database 245.

Merchant device 240 also includes a checkout application 255 which may be configured to facilitate the purchase by user 205 or delegate 232 of goods or services identified by marketplace application 250. Checkout application 255 may be configured to accept payment information from or on behalf of user 205, such as through delegate 232, through payment service provider server 270 over network 260. For example, checkout application 255 may receive and process a payment confirmation from payment service provider server 270, as well as transmit transaction information to the payment provider and receive information from the payment provider. Checkout application 255 may also be configured to communicate with a PIN pad or other POS device (not shown) to allow a payment process as described herein.

Payment provider server 270 may be maintained, for example, by an online payment service provider which may provide payment between user 205 and delegate 232 and the operator of merchant device 240. In this regard, payment provider server 270 includes one or more payment applications 275 which may be configured to interact with user device 210, delegate device 232, and/or merchant device 240 over network 260 to facilitate the purchase of goods or services by delegate 232 of delegate device 210 at a merchant POS as discussed above.

Payment provider server 270 also maintains a plurality of user accounts 280, each of which may include account infatuation 285 associated with individual users. For example, account information 285 may include private financial information of users of devices such as account numbers, passwords, device identifiers, user names, phone numbers, credit card information, bank information, PINs/passwords, coupons, discounts, incentives, loyalty points, value items, or other financial information which may be used to facilitate online transactions by user 205. Other information may include photos of delegates, conditions for delegate use, delegate identifiers, and payment codes. Merchant details may also be stored within account information 285 or another part of payment provider server 270. Advantageously, payment application 275 may be configured to interact with merchant device 240 on behalf of delegate 232 during a transaction with checkout application 255 to track and manage purchases made by users and delegates.

A transaction processing application 290, which may be part of payment application 275 or separate, may be configured to receive information from a user device, a delegate device, and/or a merchant device for processing and storage in a payment database 295. Transaction processing application 290 may include one or more applications to process information from user 205 and/or delegate 232 for processing a payment at a merchant POS as described herein. As such, transaction processing application 290 may store details of a payment request and payment associated with transaction between a merchant and a delegate. Payment application 275 may be further configured to determine the existence of and to manage accounts for user 205, as well as create new accounts if necessary.

Payment database 295 may store transaction details from completed transactions, including authorization details and/or details of the transaction. Such information may also be stored in a third party database accessible by the payment provider and/or the merchant.

Figure 3:
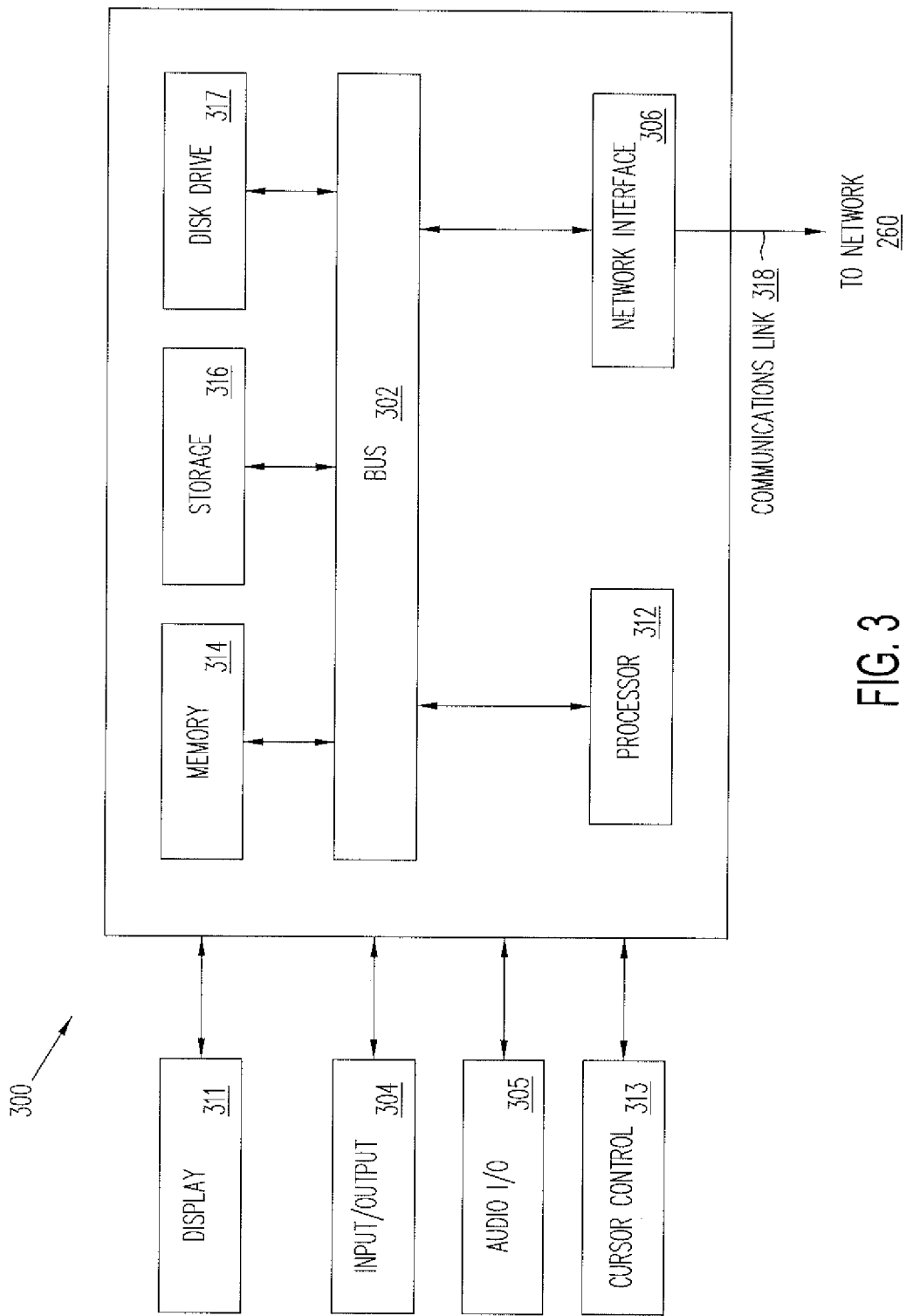
FIG. 3 is a block diagram of a computer system suitable for implementing one or more components in FIG. 2 according to one embodiment of the present disclosure.

FIG. 3 is a block diagram of a computer system 300 suitable for implementing one or more embodiments of the present disclosure. In various implementations, the user device and/or the delegate device may comprise a personal computing device (e.g., a smart phone, PC, or computing tablet) capable of communicating with the network. The merchant and/or payment provider may utilize a network computing device (e.g., a network server, a checkout terminal, or the like) capable of communicating with the network. It should be appreciated that each of the devices utilized by users, merchants, and payment providers may be implemented as computer system 300 in a manner as follows.

Computer system 300 includes a bus 302 or other communication mechanism for communicating information data, signals, and information between various components of computer system 300. Components include an input/output (I/O) component 304 that processes a user action, such as selecting keys from a keypad/keyboard, selecting one or more buttons or links, etc., and sends a corresponding signal to bus 302. I/O component 304 may also include an output component, such as a display 311 and a cursor control 313 (such as a keyboard, keypad, mouse, etc.). An optional audio input/output component 305 may also be included to allow a user to use voice for inputting information by converting audio signals. Audio I/O component 305 may allow the user to hear audio. A transceiver or network interface 306 transmits and receives signals between computer system 300 and other devices, such as another user device, a delegate device, a merchant device, or a payment provider server via network 260. In one embodiment, the transmission is wireless, although other transmission mediums and methods may also be suitable. A processor 312, which can be a micro-controller, digital signal processor (DSP), or other processing component, processes these various signals, such as for display on computer system 300 or transmission to other devices via a communication link 318. Processor 312 may also control transmission of information, such as cookies or IP addresses, to other devices.

Components of computer system 300 also include a system memory component 314 (e.g., RAM), a static storage component 316 (e.g., ROM), and/or a disk drive 317. Computer system 300 performs specific operations by processor 312 and other components by executing one or more sequences of instructions contained in system memory component 314. Logic may be encoded in a computer readable medium, which may refer to any medium that participates in providing instructions to processor 312 for execution. Such a medium may take many forms, including but not limited to, non-volatile media, volatile media, and transmission media. In various implementations, non-volatile media includes optical or magnetic disks, volatile media includes dynamic memory, such as system memory component 314, and transmission media includes coaxial cables, copper wire, and fiber optics, including wires that comprise bus 302. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 300. In various other embodiments of the present disclosure, a plurality of computer systems 300 coupled by communication link 318 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

We claim:

1. A system for conducting a secure point of sale (POS) transaction with a merchant by authenticating an identity of a delegate, the system comprising:
    a non-transitory memory having stored thereon instructions; and
    one or more hardware processors configured to execute the instructions to cause the system to perform operations comprising:
        receiving, by a server and from a first user device of an owner of an account, a first request to designate a person as a delegate of the owner to make payments for an owner-specified transaction on behalf of the owner by using the account;
        obtaining, by the server and from the first user device, delegate-specific information of the delegate, the delegate-specific information including a photo of the delegate;
        associating, by the server, the delegate-specific information with the account;
        generating, by the server, a one-time code for the owner-specified transaction;
        associating, by the server, the one-time code with the first request and with the owner-specified transaction;
        transmitting, by the server, the one-time code to a second user device of the delegate;
        receiving, by the server and from a POS device of a merchant, a transaction request including the one-time code, wherein the transaction request is received after the receiving the first request, the obtaining, the associating the delegate-specific information, the generating the one-time code, the associating the one-time code, and the transmitting;
        accessing, by the server in response to the received one-time code, the account;
        retrieving, by the server, the delegate-specific information associated with the account;
        determining, by the server, whether the transaction request corresponds with the owner-specified transaction and whether the delegate is authorized to make a payment on behalf of the owner;
        transmitting, by the server in response to determining that the transaction request corresponds with the owner-specified transaction and that the delegate is authorized to make the payment on behalf of the owner, the delegate-specific information including the photo of the delegate to the POS device; and
        processing, by the server, the owner-specified transaction after the transmitting.

2. The system of claim 1, wherein the one-time code identifies a limitation associated with the owner-specified transaction.

3. The system of claim 1, wherein the one-time code is generated based on transaction information specified by the owner of the account.

4. The system of claim 3, wherein the transaction information comprises a text identifier of the delegate and one or more use conditions for accessing the account by the delegate.

5. The system of claim 4, wherein the one or more use conditions comprise an amount limit or a time limit.

6. The system of claim 1, wherein the retrieving comprises retrieving the photo of the delegate based on the one-time code.

7. The system of claim 4, wherein the text identifier comprises a phone number associated with the delegate.

8. A non-transitory machine-readable medium having stored thereon machine-readable instructions executable to cause a machine to perform operations comprising:
    receiving, by a server and from a first user device of an owner of an account, a first request to enable a person as a delegate of the owner to make payments for an owner-specified transaction on behalf of the owner by using the account;
    obtaining, by the server and from the first user device, delegate-specific information of the delegate, the delegate-specific information including a photo of the delegate;
    associating, by the server, the delegate-specific information with the account;
    generating, by the server, an authorization code for the owner-specified transaction;
    associating, by the server, the authorization code with the first request and with the owner-specified transaction;
    transmitting, by the server, the authorization code to a second user device of the delegate;
    receiving, by the server and from a point of sale (POS) device of a merchant, a payment request that includes the authorization code, wherein the payment request is received after the receiving the first request, the obtaining, the associating the delegate-specific information, the generating the authorization code, the associating the authorization code, and the transmitting;
    accessing, by the server in response to the authorization code in the received payment request, the account;
    retrieving, by the server, the delegate-specific information from the account;
    determining, by the server, whether the payment request corresponds with the owner-specified transaction and whether the delegate is authorized to make a payment on behalf of the owner; and
    transmitting, by the server in response to determining that the payment request corresponds with the owner-specified transaction and that the delegate is authorized to make the payment on behalf of the owner, the delegate-specific information including the photo of the delegate to the POS device.

9. The non-transitory machine-readable medium of claim 8, wherein the authorization code is a one-time use code.

10. The non-transitory machine-readable medium of claim 9, wherein the authorization code is generated based on transaction information specified by the owner.

11. The non-transitory machine-readable medium of claim 10, wherein the transaction information comprises a text identifier of the delegate and one or more use conditions for accessing the account by the delegate.

12. The non-transitory machine-readable medium of claim 11, wherein the one or more use conditions comprise an amount limit or a time limit.

13. The non-transitory machine-readable medium of claim 8, wherein the retrieving comprises retrieving the photo of the delegate based on the authorization code.

14. The non-transitory machine-readable medium of claim 11, wherein the text identifier comprises a phone number associated with the delegate.

15. A method for conducting a secure point of sale (POS) transaction with a merchant by authenticating an identity of a delegate, the method comprising:
   receiving, by a server and from a first user device of an owner of an account, a first request to designate a person as a delegate of the owner to make payments for an owner-specified transaction by using the account;
   obtaining, by the server and from the first user device, delegate-specific information of the delegate, the delegate-specific information including a photo of the delegate;
   associating, by the server, the delegate-specific information with the account;
   generating, by the server, a one-time code for the owner-specified transaction;
   associating, by the server the one-time code with the first request and with the owner-specified transaction;
   transmitting, by the server the one-time code to a second user device of the delegate;
   receiving, by the server and from a POS of a merchant, a payment request that includes the one-time code, wherein the payment request is received after the receiving the first request, the obtaining, the associating the delegate-specific information, the generating the one-time code, the associating the one-time code, and the transmitting;
   accessing, by the server in response to the received one-time code, the account;
   retrieving, by the server, the delegate-specific information associated with the account;
   determining, by the server, whether the payment request corresponds with the owner-specified transaction and whether the delegate is authorized to make a payment on behalf of the owner; and
   transmitting, by the server and in response to determining that the payment request corresponds with the owner-specified transaction and that the delegate is authorized to make the payment on behalf of the owner, the delegate-specific information including the photo of the delegate to the POS.

16. The method of claim 15, wherein the one-time code identifies a limitation on the owner-specified transaction.

17. The method of claim 15, wherein the one-time code is generated based on transaction information specified by the owner.

18. The method of claim 17, wherein the transaction information comprises a text identifier identifying the delegate and one or more use conditions for accessing the account by the delegate.

19. The method of claim 18, wherein the one or more use conditions comprise an amount limit or a time limit.

20. The method of claim 15, wherein the retrieving comprises retrieving the photo of the delegate based on the one-time code.

21. The method of claim 18, wherein the text identifier comprises a phone number associated with the delegate.

* * * * *